(12) United States Patent
Yamada et al.

(10) Patent No.: US 10,976,083 B2
(45) Date of Patent: Apr. 13, 2021

(54) COLD ENERGY STORAGE EVAPORATOR AND VEHICLE REFRIGERATION CYCLE DEVICE PROVIDED WITH SAME

(71) Applicant: DENSO CORPORATION, Kariya (JP)

(72) Inventors: Atsushi Yamada, Kariya (JP); Shin Nishida, Kariya (JP); Takayuki Ota, Kariya (JP); Takashi Danjo, Kariya (JP)

(73) Assignee: DENSO CORPORATION, Kariya (JP)

( * ) Notice: Subject to any disclaimer, the term of this patent is extended or adjusted under 35 U.S.C. 154(b) by 83 days.

(21) Appl. No.: 16/191,851

(22) Filed: Nov. 15, 2018

(65) Prior Publication Data

US 2019/0084378 A1 Mar. 21, 2019

Related U.S. Application Data

(63) Continuation of application No. PCT/JP2017/009772, filed on Mar. 10, 2017.

(30) Foreign Application Priority Data

May 19, 2016 (JP) .............................. JP2016-100857

(51) Int. Cl.
*F25B 39/02* (2006.01)
*F28D 1/053* (2006.01)
*F28D 20/02* (2006.01)
*B60H 1/32* (2006.01)

(52) U.S. Cl.
CPC ............... *F25B 39/02* (2013.01); *B60H 1/32* (2013.01); *F28D 1/053* (2013.01); *F28D 20/02* (2013.01); *B60H 2001/3236* (2013.01); *B60H 2001/3289* (2013.01); *B60H 2001/3297* (2013.01); *Y02E 60/14* (2013.01)

(58) Field of Classification Search
CPC ..... B60H 1/32; B60H 200/3289; F25B 39/02; F28D 1/053; F28D 20/02
See application file for complete search history.

(56) References Cited

U.S. PATENT DOCUMENTS

| | | |
|---|---|---|
| 2011/0239696 A1 | 10/2011 | Takagi |
| 2014/0318176 A1 | 10/2014 | Takagi |
| 2015/0168047 A1* | 6/2015 | Danjyo ............... F28D 1/05383 62/467 |
| 2015/0198383 A1 | 7/2015 | Kitoh et al. |

(Continued)

FOREIGN PATENT DOCUMENTS

| | | |
|---|---|---|
| JP | H04257715 A | 9/1992 |
| JP | 2010149814 A | 7/2010 |

(Continued)

*Primary Examiner* — Elizabeth J Martin
(74) *Attorney, Agent, or Firm* — Harness, Dickey & Pierce, P.L.C.

(57) ABSTRACT

A cold energy storage evaporator is used in a vehicle refrigeration cycle device configured to cool a vehicle compartment. The cold energy storage evaporator includes a refrigerant tube through which a refrigerant flows, and a cold energy storage member that is in close contact with the refrigerant tube, the cold energy container accommodating therein a cold energy storage member configured to freeze due to heat absorption by the refrigerant. A melting point of the cold energy storage member is higher than 11 degrees Celsius.

1 Claim, 8 Drawing Sheets

(56) References Cited

U.S. PATENT DOCUMENTS

| | | | |
|---|---|---|---|
| 2015/0211806 A1* | 7/2015 | Ota | F28D 1/05366 |
| | | | 165/10 |
| 2016/0024364 A1 | 1/2016 | Yoshinari et al. | |
| 2016/0114646 A1 | 4/2016 | Danjyo et al. | |

FOREIGN PATENT DOCUMENTS

| JP | 2013166845 A | 8/2013 |
|---|---|---|
| JP | 2013256262 A | 12/2013 |
| JP | 2015137807 A | 7/2015 |
| WO | WO-2014024375 A1 | 2/2014 |
| WO | WO-2014196163 A1 | 12/2014 |

\* cited by examiner

COLD ENERGY STORAGE EVAPORATOR AND VEHICLE REFRIGERATION CYCLE DEVICE PROVIDED WITH SAME

CROSS REFERENCE TO RELATED APPLICATION

The present application is a continuation application of International Patent Application No. PCT/JP2017/009772 filed on Mar. 10, 2017, which designated the United States and claims the benefit of priority from Japanese Patent Application No. 2016-100857 filed on May 19, 2016. The entire disclosures of all of the above applications are incorporated herein by reference.

TECHNICAL FIELD

The present disclosure relates to a cold energy storage evaporator including a cold energy storage member and a vehicle refrigeration cycle device provided with the cold energy storage evaporator.

BACKGROUND ART

In recent years, more and more vehicles perform so-called idle reduction, which automatically stops the internal combustion engine when the vehicle stops. In such a refrigeration cycle device of a vehicle, since the compressor is stopped by the idle reduction control, a cold energy storage evaporator is used to perform cooling during the idle reduction.

SUMMARY

A cold energy storage evaporator according to an aspect of the present disclosure is used in a vehicle refrigeration cycle device configured to cool a vehicle compartment, and the cold energy storage evaporator includes: a refrigerant tube through which a refrigerant flows; and a cold energy container that is in close contact with the refrigerant tube, the cold energy container accommodating therein a cold energy storage member configured to freeze due to heat absorption by the refrigerant. A melting point of the cold energy storage member is higher than 11 degrees Celsius.

EMBODIMENTS

Figure 1:
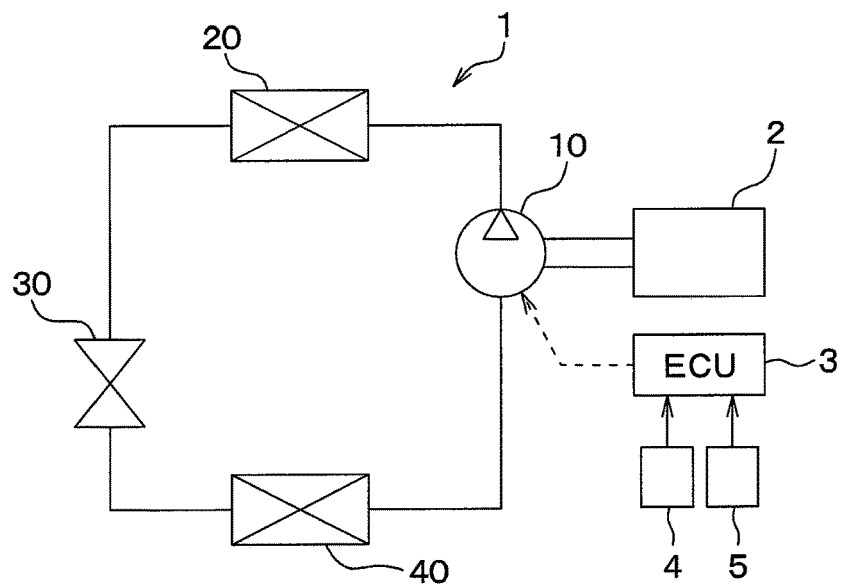
FIG. 1 is a diagram illustrating a refrigeration cycle device including a cold energy storage evaporator according to at least one embodiment of the present disclosure.

Hereinafter, embodiments of the present disclosure will be described with reference to the drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration.

First Embodiment

A first embodiment of the present disclosure will be described.

As shown in FIG. 1, a vehicular refrigeration cycle device 1 that is a part of an air-conditioning device for an air-conditioning of a vehicle compartment includes a compressor 10, a radiator 20, a decompressor 30, and a cold energy storage evaporator 40. These components are annularly connected together with each other through pipes, and thereby a refrigerant circulating passage is constituted. Hereinafter, the vehicular refrigeration cycle device 1 may be simply referred to as a refrigeration cycle device 1.

The compressor 10 is driven by an internal combustion engine 2 that is a driving source for vehicle traveling. The compressor 10 stops when the internal combustion engine 2 stops. The compressor 10 draws the refrigerant from the cold energy storage evaporator 40, compresses and discharges the drawn refrigerant to the radiator 20.

The compressor 10 is a variable capacity compressor capable of controlling the amount of the refrigerant discharged per rotation. A wobble type compressor, which continuously changes the discharge amount of the refrigerant by changing the inclination of the wobble plate, may be used as the compressor 10, for example. Actuations of the compressor 10 are controlled by an air-conditioning controller 3 described later, and thus the amount of the discharged refrigerant is controlled.

The radiator 20 cools the high-temperature refrigerant discharged from the compressor 10 by a heat exchange with an outside air. The decompressor 30 decompresses the refrigerant that has cooled by the radiator 20.

The cold energy storage evaporator 40 absorbs heat of a blown air sent to the vehicle compartment, evaporates the refrigerant decompressed by the decompressor 30, and thus cools the blown air. The cold energy storage evaporator 40 includes a cold energy container 6 accommodating therein a cold energy storage member 61. The details of the cold energy storage evaporator 40 will be described later.

The air-conditioning device includes the air-conditioning controller 3 that controls electric components for air-conditioning included in the air-conditioning device, such as a blower (not shown) and a door actuator (not shown). The air-conditioning controller 3 includes a well-known microcomputer including a CPU, a RAM, a ROM, an EEPROM and the like (not shown). The air-conditioning controller 3 performs arithmetic processing according to a program stored in the microcomputer. A storage unit of the air-conditioning controller 3 is configured by a non-transitory tangible storage medium.

Sensor signals from a sensor group 4 and switching signals from a switch group 5 are input to the air-conditioning controller 3. In the present embodiment, the sensor group 4 includes: an outside air temperature sensor detecting an outside air temperature TAM; an inside air temperature sensor detecting an inside air temperature TR that is a temperature in the vehicle compartment; a solar irradiance sensor detecting a solar insolation amount TS; and an evaporator temperature sensor detecting an evaporator temperature sensor detecting an evaporator refrigerant temperature TE. The evaporator refrigerant temperature TE of the present embodiment is a surface temperature of the cold energy storage evaporator 40. Specifically, the evaporator temperature sensor is a thermistor that detects a temperature of an air side fin 46 (see FIG. 4 for example) as the evaporator refrigerant temperature.

The switch group is provided in an air-conditioning operation panel in an instrument panel. In the present embodiment, the switch group 5 includes an air-conditioning switch, an economy switch, an inside-outside air selection switch, a temperature setting switch, an air volume switch, a blowing mode selection switch and the like. The air-conditioning switch is a switch for instructing a start and stop of the refrigeration cycle device 1. The economy switch is a switch for setting an economy mode. The inside-outside air selection switch is a switch for switching between an inside air intake mode and an outside air intake mode. The temperature setting switch is a switch for setting a temperature of the vehicle compartment to a desired temperature. The air volume switch is a switch for setting a volume of air blown by a blower (not shown). The blowing mode selection switch is a switch for selecting a blowing mode.

The economy switch is a switch for switching between a cool mode that puts weight on comfort and the economy mode that puts weight on power saving. When the economy mode is selected by using the economy switch, the temperature at which the compressor 10 is turned on or off is set higher than in the cool mode.

Figure 2:
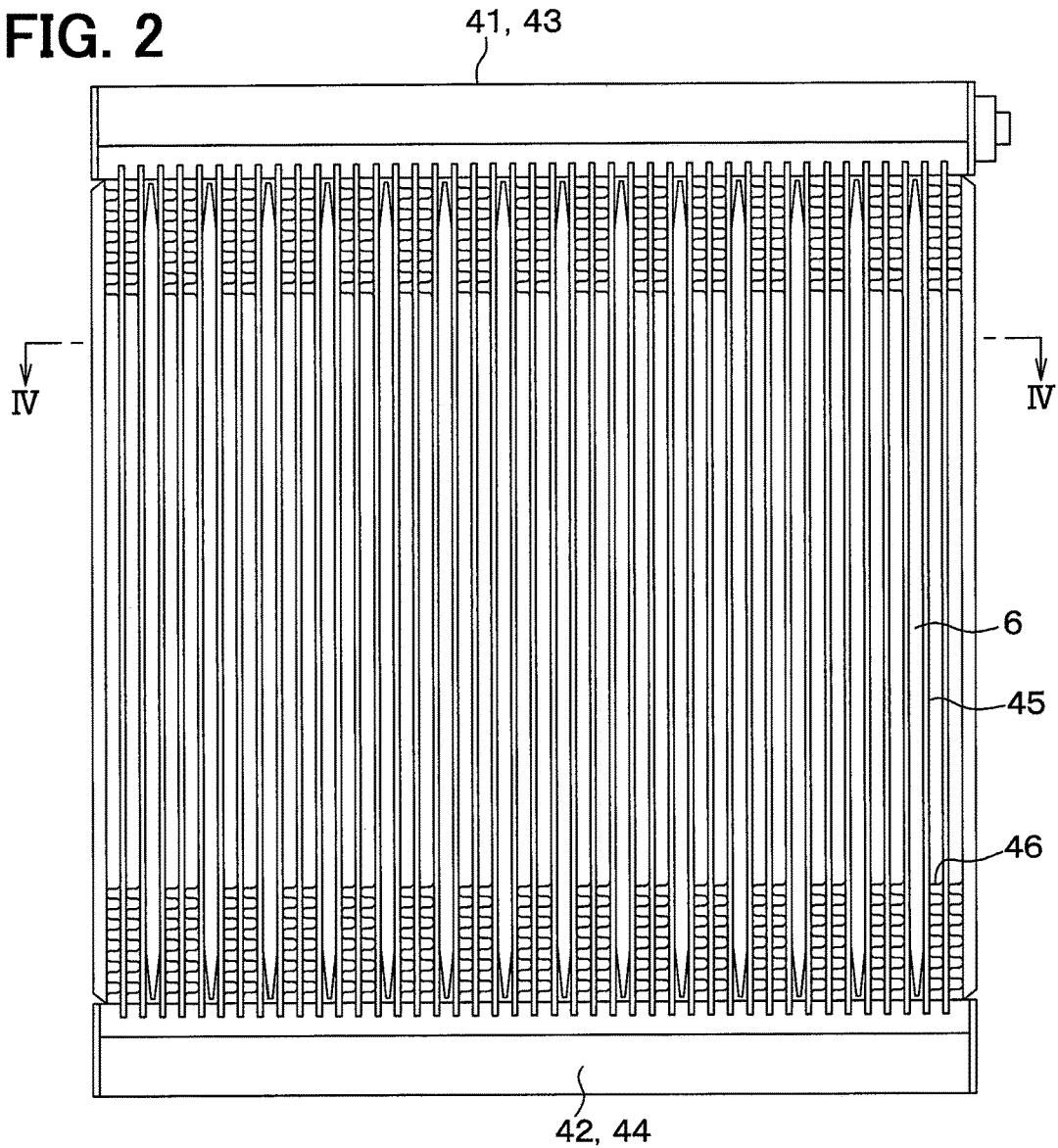
FIG. 2 is a front view of the cold energy storage evaporator according to at least one embodiment.
Figure 3:
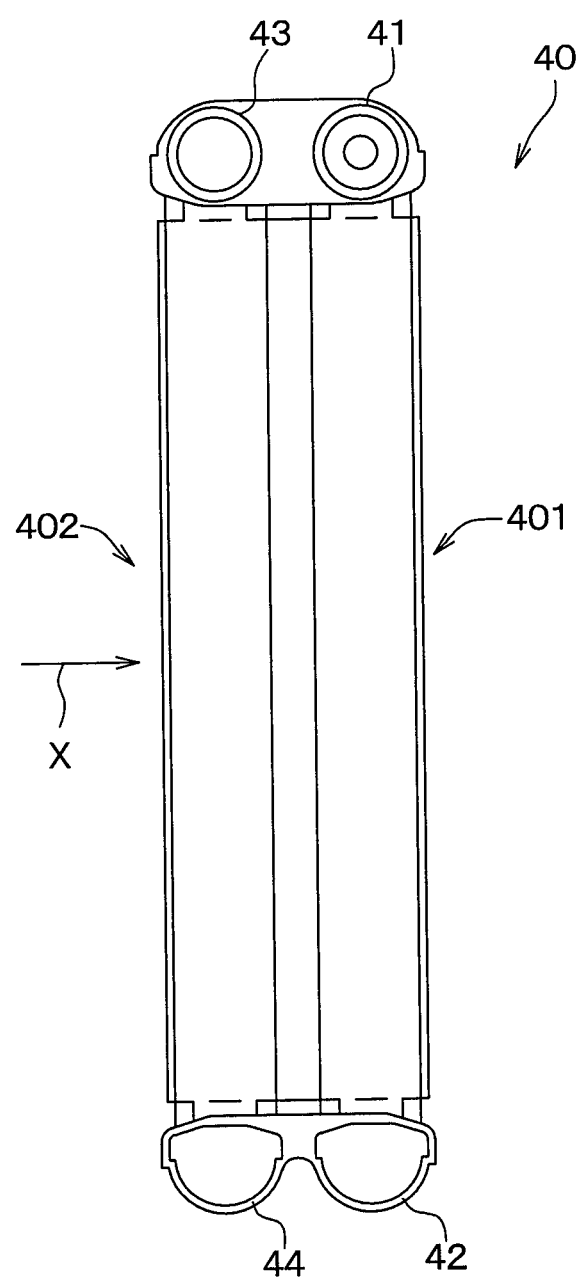
FIG. 3 is a right side view illustrating the cold energy storage evaporator of FIG. 2.

As shown in FIGS. 2 and 3, the cold energy storage evaporator 40 includes pairs of header tanks 41, 42, 43, 44, and refrigerant tubes 45 through which the header tanks 41, 42, 43, 44 communicate with each other. An arrow X shown in FIG. 3 indicates a direction of an air flow. In FIG. 2, the header tanks 43, 44 are located upstream of the header tanks 41, 42 in the air flow.

Figure 4:
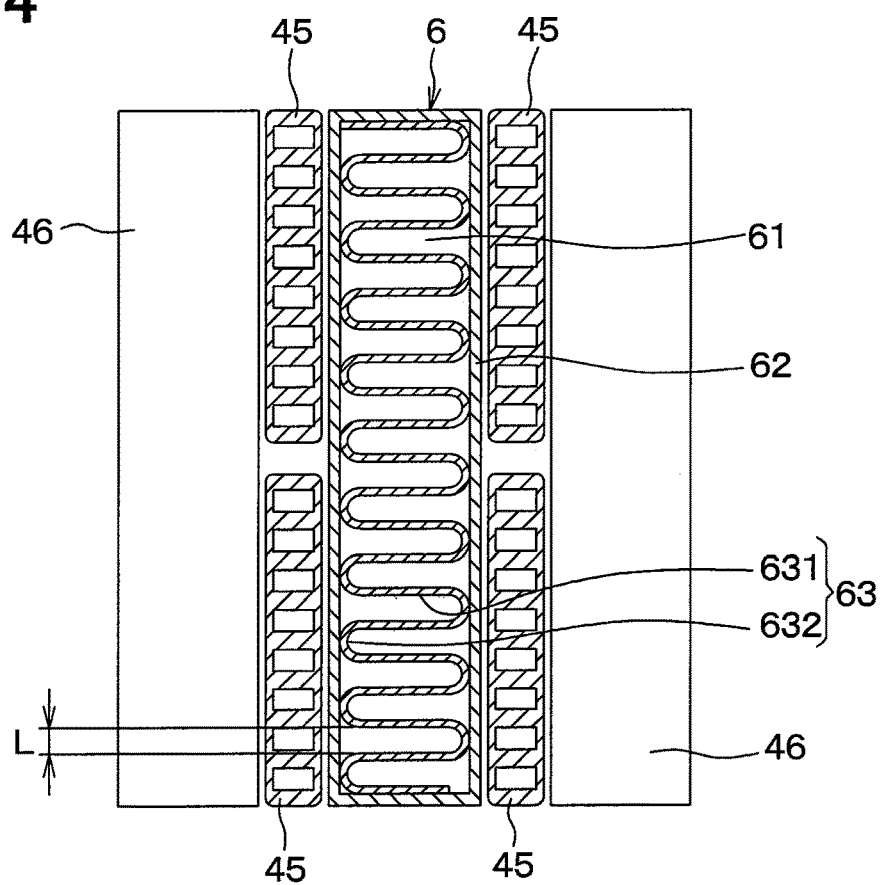
FIG. 4 is a cross-sectional view taken along a line IV-IV of FIG. 2.

The refrigerant tube 45 has a flat shape and defines therein a refrigerant passage through which the refrigerant flows. Specifically, the refrigerant tube 45 is a multi-hole tube having multiple refrigerant passages therein, as shown in FIG. 4. The refrigerant tube 45 is made of aluminum and formed by extraction molding.

Each of the header tanks 41, 42, 43, 44 is connected to one end or the other end of the refrigerant tube 45 and distributes the refrigerant to the refrigerant tubes 45 or collects the refrigerant flowing out of the refrigerant tubes 45. The header tanks 41, 42, 43, 44 are made of metal such as aluminum.

Specifically, a first header tank 41 and a second header tank 42 are spaced from each other by a predetermined distance, as shown in FIGS. 2, 3. Multiple refrigerant tubes 45 spaced from each other are arranged between the first header tank 41 and the second header tank 42. Each of the refrigerant tubes 45 communicates with the first, second header tanks 41, 42 through end portions. A first heat exchanging portion 401 is constituted by the first header tank 41, the second header tank 42, and the refrigerant tubes 45 between the first, second header tanks 41, 42.

Similarly, a third header tank 43 and a fourth header tank 44 are spaced from each other by the predetermined distance. Multiple refrigerant tubes 45 spaced from each other are arranged between the third header tank 43 and the fourth header tank 44. Each of the refrigerant tubes 45 communicates with the third, fourth header tanks 43, 44 through end portions. A second heat exchanging portion 402 is constituted by the third header tank 43, the fourth header tank 44, and the refrigerant tubes 45 between the third, fourth header tanks 43, 44.

That is, the cold energy storage evaporator 40 includes the first heat exchanging portion 401 and the second heat exchanging portion 402 which are layered. The second heat exchanging portion 402 is located upstream of the first heat exchanging portion 401 in the air flow indicated by the arrow X.

A joint (not shown) that is a refrigerant inlet is provided at an end portion of the first header tank 41. The first header tank 41 is partitioned into a first section and a second section by a partition plate provided at a center part in a longitudinal direction of the header tank 41. According to this, the refrigerant tubes 45 are grouped into a first group and a second group.

The refrigerant is supplied to the first section of the first header tank 41. The refrigerant in the first section of the first header tank 41 is distributed to the refrigerant tubes in the first group. The refrigerant flows into the second header tank 42 through the first group and joins together.

The refrigerant in the second header tank 42 is distributed again to the refrigerant tubes in the second group. The refrigerant flows into the second section of the first header tank 41 through the second group. Accordingly, a U-shape passage is formed in the first heat exchanging portion 401.

A joint (not shown) that is a refrigerant outlet is provided at an end portion of the third header tank 43. The third header tank 43 is partitioned into a first section and a second section by a partition plate provided at a center part in a longitudinal direction of the header tank 41.

According to this, the refrigerant tubes 45 are grouped into a first group and a second group. The first section of the third header tank 43 is next to the second section of the first header tank 41. The first section of the third header tank 43 communicates with the second section of the first header tank 41.

The refrigerant flows from the second section of the first header tank 41 into the first section of the third header tank 43. The refrigerant in the first section of the third header tank 43 is distributed to the refrigerant tubes in the first group. The refrigerant flows into the fourth header tank 44 through the first group and joins together. The refrigerant in the fourth header tank 44 is distributed again to the refrigerant tubes in the second group.

The refrigerant flows into the second section of the third header tank 43 through the second group. Accordingly, a U-shape passage is formed in the second heat exchanging portion 402. The refrigerant in the second section of the third header tank 43 flows out through the refrigerant outlet of the third header tank 43 toward the compressor 10.

As shown in FIG. 2, the cold energy storage evaporator 40 includes multiple gaps defined between adjacent refrigerant tubes 45. The cold energy containers 6 are provided in some of the gaps of the cold energy storage evaporator 40, and the air side fins 46 are provided in the other gaps. The gaps in which the cold energy containers 6 are provided constitute an accommodation portion of the cold energy storage member 61. The gaps in which the air side fins 46 are provided constitute air passages through which the air flows.

The air side fin 46 are in contact with two adjacent refrigerant tubes 45 to promote heat exchange between the refrigerant and the blown air sent to the vehicle compartment. The air side fin 46 is joined with two adjacent refrigerant tubes 45. The air side fin 46 is a corrugated fin made by bending a thin metal plate such as aluminum plate into a corrugated shape.

As shown in FIG. 4, the cold energy container 6 includes the cold energy storage member 61, a casing 62 defining an inside space in which the cold energy storage member 61 is accommodated, and an inner fin 63 provided in the casing 62. The cold energy storage member 61 includes a cold energy storage material, an example of which is normal paraffin.

The melting point of the cold energy storage member 61 is higher than 11 degrees Celsius. The heat of the cold energy storage member 61 is absorbed by the refrigerant flowing through the refrigerant tubes 45, and the cold energy storage member 61 freezes.

The casing 62 has a flat cylindrical shape. The casing 62 is made of aluminum, and both ends of the casing 62 in a longitudinal direction (i.e., a direction perpendicular to a sheet of FIG. 4) are closed by pressing the cylindrical shape in a thickness direction. The casing 62 corresponds to a casing member defining therein the inner space in which the cold energy storage member 61 is accommodated.

Outer wall surfaces of two surfaces of the casing 62 facing each other are joined with two adjacent refrigerant tubes 45 by brazing respectively. That is, the casing 62 is in close contact with two adjacent refrigerant tubes 45. Accordingly, the refrigerant flowing through the refrigerant tubes 45 exchanges heat with the cold energy storage member 61 through the casing 62.

The inner fin 63 is a corrugated fin made by bending a thin metal plate such as aluminum plate into a corrugated shape. The inner fin 63 includes multiple plate portions 631 having a flat plate shape and multiple bent portions 632 bent in an arc shape.

Peak portions of the bent portions 632 of the inner fin 63 are joined with an inner wall surface of the casing 62 by brazing. Accordingly, the plate portions 631 connect two walls of the casing 62 facing each other. The inner fin 63 serves as a connection member that connects two walls of the casing 62 facing each other.

Next, basic operations of the refrigeration cycle device 1 according to the present embodiment will be described. When the air-conditioning such as cooling is requested by an occupant, the compressor 10 is driven by the internal combustion engine 2. The compressor 10 draws the refrigerant from the cold energy storage evaporator 40, compresses and discharges the refrigerant. The refrigerant discharged from the compressor 10 releases heat in the radiator 20. The refrigerant flowing out of the radiator 20 is decompressed by the decompressor 30 and supplied to the cold energy storage evaporator 40. The refrigerant evaporates in the cold energy storage evaporator 40 to cool the cold energy container 6 and cool the blown air through the air side fin 46.

When the vehicle temporarily stops, the internal combustion engine 2 stops to save energy, and thus the compressor 10 stops. Subsequently, the refrigerant in the cold energy storage evaporator 40 gradually loses cooling capacity. At this time, the cold energy storage member 61 absorbs heat of the blown air to cool the blown air. The heat of the air is absorbed by the cold energy storage member 61 through the air side fin 46, the refrigerant tube 45, the casing 62 and the inner fin 63. Consequently, the blown air can be cooled by the cold energy storage member 61 even when the refrigeration cycle device 1 temporarily stops. After the vehicle starts running again, the internal combustion engine 2 drives the compressor 10 again. Accordingly, the refrigeration cycle device 1 cools the cold energy storage member 61 to store cold energy again.

Next, specifications of the cold energy storage evaporator 40 will be described.

In the present embodiment, the air flowing out through the cold energy storage evaporator 40 is referred to as an evaporator blown air. In the present embodiment, an acceptable temperature that is an upper limit of a temperature of the evaporator blown air which is acceptable for an occupant is 15 degrees Celsius. In the present embodiment, a time length from a time when the internal combustion engine 2 stops during the stop of the vehicle (i.e., from a stop of the compressor 10) to a time when the evaporator blown air temperature that is the temperature of the evaporator blown air rises up to the acceptable temperature is referred to as an acceptable temperature reaching time.

Further, in the present embodiment, the resistance generated when the heat is transferred from the cold energy storage member 61 to the surface of the air side fin 46 is referred to as a cold energy container thermal resistance R. In the present embodiment, a distance between adjacent plate portions 631 is referred to as a cold energy storage member heat transfer distance L, and a thermal conductivity of the cold energy storage member 61 is represented by λ. Further in the present embodiment, a total surface area of portions of one inner fin 63 in contact with the cold energy storage member 61 is referred to as a heat transfer area A. The cold energy storage member heat transfer distance L corresponds to a thickness of the cold energy storage member 61 interposed between the adjacent plate portions 631.

Specifically, the cold energy container thermal resistance R can be obtained by the following equation 1.

$$R = L/(\lambda * A) \qquad \text{Equation 1}$$

Figure 5:
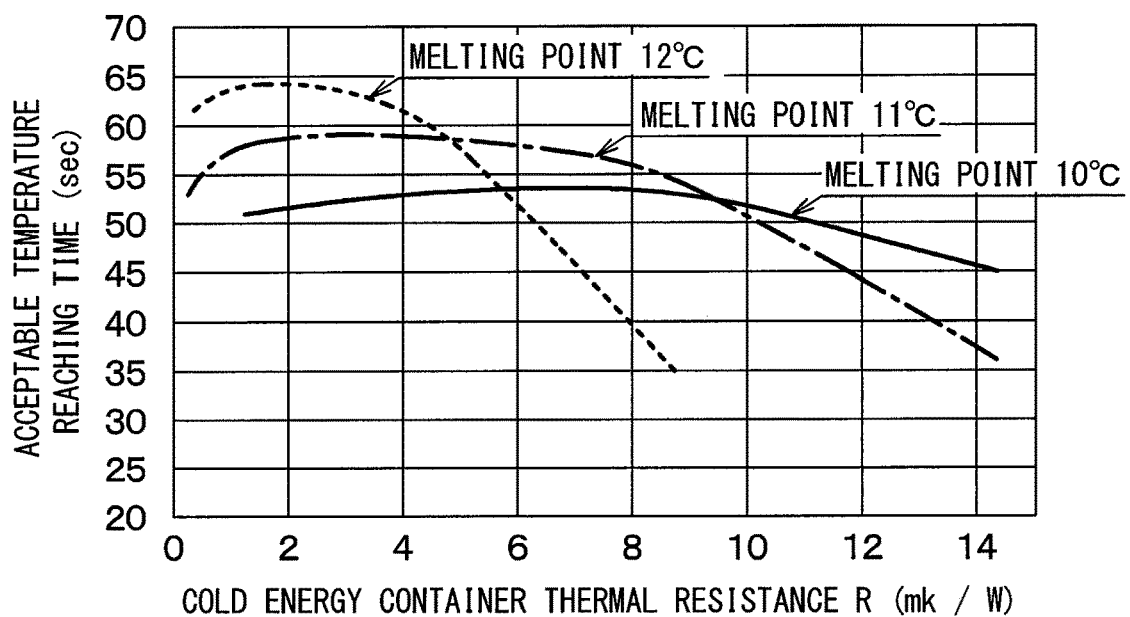
FIG. 5 is a graph showing a relationship between a cold energy container thermal resistance and an acceptable temperature reaching time.

FIG. 5 shows a result of a simulation for a relationship between the cold energy container thermal resistance R and the acceptable temperature reaching time. A solid line shown in FIG. 5 is a characteristic line of the cold energy storage evaporator 40 including the cold energy storage member 61 having a melting point of 10 degrees Celsius. A dot-and-dash line shown in FIG. 5 is a characteristic line of the cold energy storage evaporator 40 including the cold energy storage member 61 having a melting point of 11 degrees Celsius. A dashed line shown in FIG. 5 is a characteristic line of the cold energy storage evaporator 40 including the cold energy storage member 61 having a melting point of 12 degrees Celsius.

The preconditions of this simulation include: the temperature of the air drawn into the cold energy storage evaporator 40 (hereinafter referred to as the evaporator drawn air) is 28 degrees Celsius; the relative humidity of the evaporator drawn air is 35%; the flow rate of the evaporator drawn air is 180 m3/h; and the acceptable temperature is 15 degrees Celsius.

According to FIG. 5, it can be found that it is necessary to decrease the cold energy container thermal resistance R in order to increase the acceptable temperature reaching time of the cold energy storage member 61 having a high melting point. A maximum value of the acceptable temperature reaching time is defined as a maximum cooling time. The maximum cooling time of the cold energy storage evaporator 40 using the cold energy storage member 61 having the melting point of 10 degrees Celsius is about 52 seconds. The maximum cooling time of the cold energy storage evaporator 40 using the cold energy storage member 61 having the melting point of 11 degrees Celsius is about 59 seconds. The maximum cooling time of the cold energy storage evaporator 40 using the cold energy storage member 61 having the melting point of 12 degrees Celsius is about 64 seconds.

Figure 6:
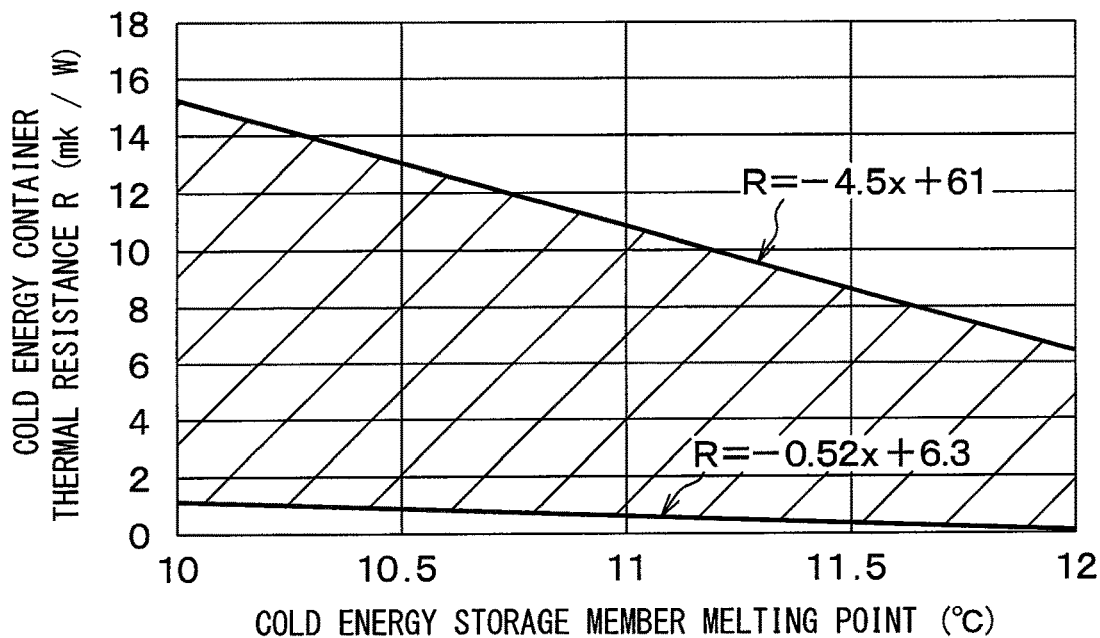
FIG. 6 is a graph showing a relationship between a melting point of a cold energy storage member and the cold energy container thermal resistance.

FIG. 6 shows a result of a simulation for a range of the cold energy container thermal resistance R (hereinafter, referred to as an optimal range of the thermal resistance) within which the acceptable temperature reaching time is at or above 80% of the maximum cooling time.

The preconditions of this simulation include: the evaporator drawn air is 28 degrees Celsius; the relative humidity of the evaporator drawn air is 35%; the flow rate of the evaporator drawn air is 180 m3/h; and the acceptable temperature is 15 degrees Celsius.

In FIG. 6, the optimal range of the thermal resistance is indicated by oblique lines. The optimal range of the thermal resistance can be calculated by the following equation 2, where x is the melting point of the cold energy storage member 61.

$$-0.52x+6.3 \leq R \leq -4.5x+61 \quad \text{Equation 2}$$

Figure 7:
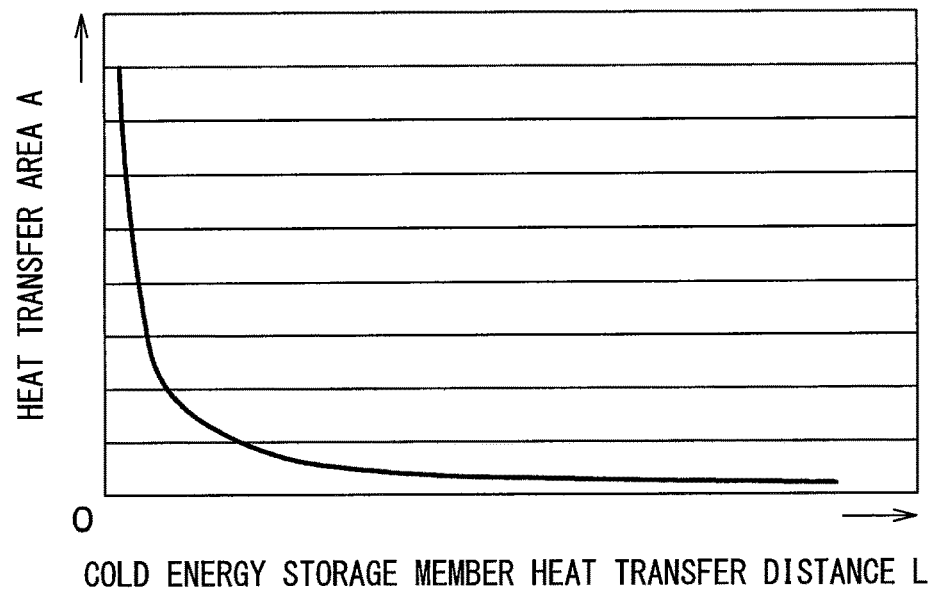
FIG. 7 is a graph showing a relationship between a cold energy storage member heat transfer distance and a heat transfer area.
Figure 8:
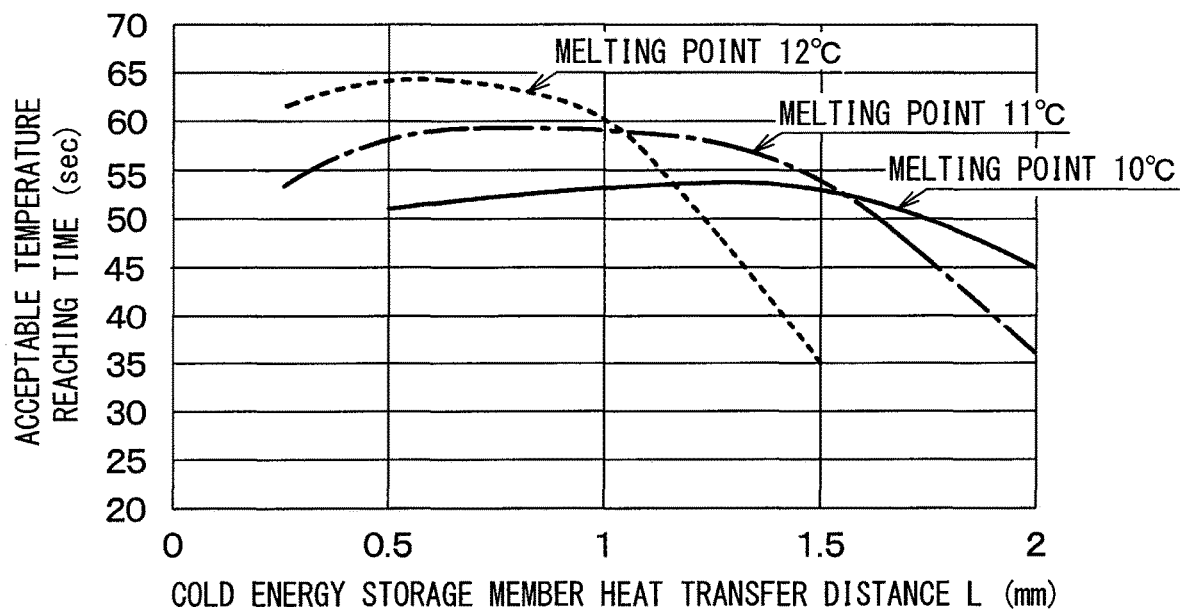
FIG. 8 is a graph showing a relationship between the cold energy storage member heat transfer distance and the acceptable temperature reaching time.

According to the above-described Equation 1, the heat transfer area A can be described as a function of the cold energy storage member heat transfer distance L. The relationship between the cold energy storage member heat transfer distance L and the heat transfer area A is shown in FIG. 7. According to this, the cold energy storage member heat transfer distance L can be substituted for the cold energy container thermal resistance R of FIGS. 5, 6, as shown in FIGS. 8, 9.

Figure 9:
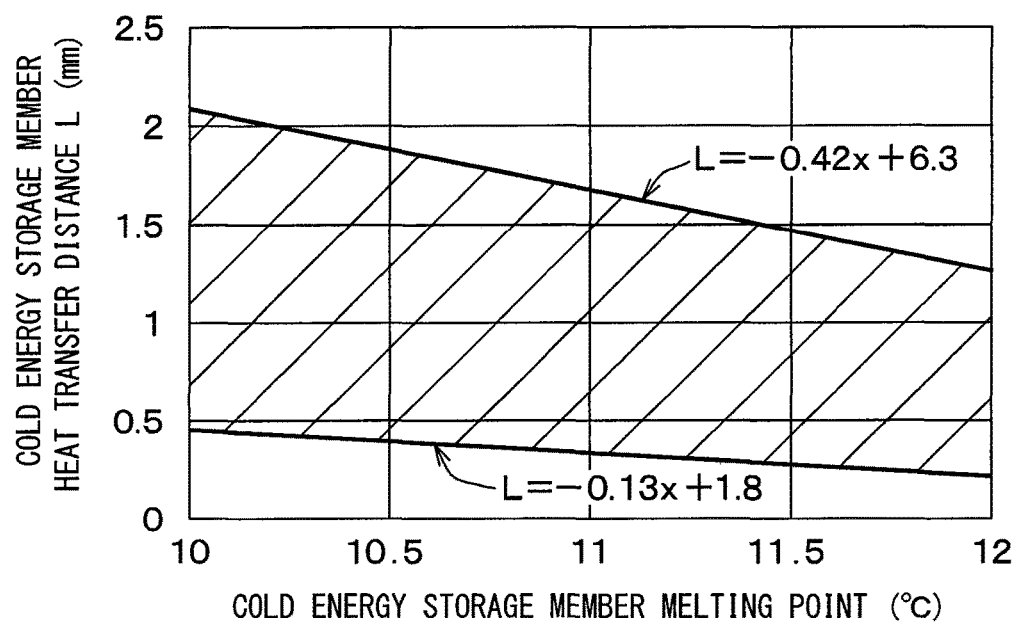
FIG. 9 is a graph showing a relationship between the melting point of the cold energy storage member and the cold energy storage member heat transfer distance.

FIG. 9 shows a result of a simulation for a range of the cold energy storage member heat transfer distance L (hereinafter, referred to as optimal range of the heat transfer) within which the acceptable temperature reaching time is at or above 80% of the maximum cooling time. The preconditions for the simulation in FIG. 9 are the same as the prerequisites for the simulation in FIG. 6.

In FIG. 9, the optimal range of the heat transfer is indicated by oblique lines. The optimal range of the heat transfer can be calculated by the following equation 3, where x is the melting point of the cold energy storage member 61.

$$-0.13x+1.8 \leq L \leq -0.42x+6.3 \quad \text{Equation 3}$$

Figure 10:
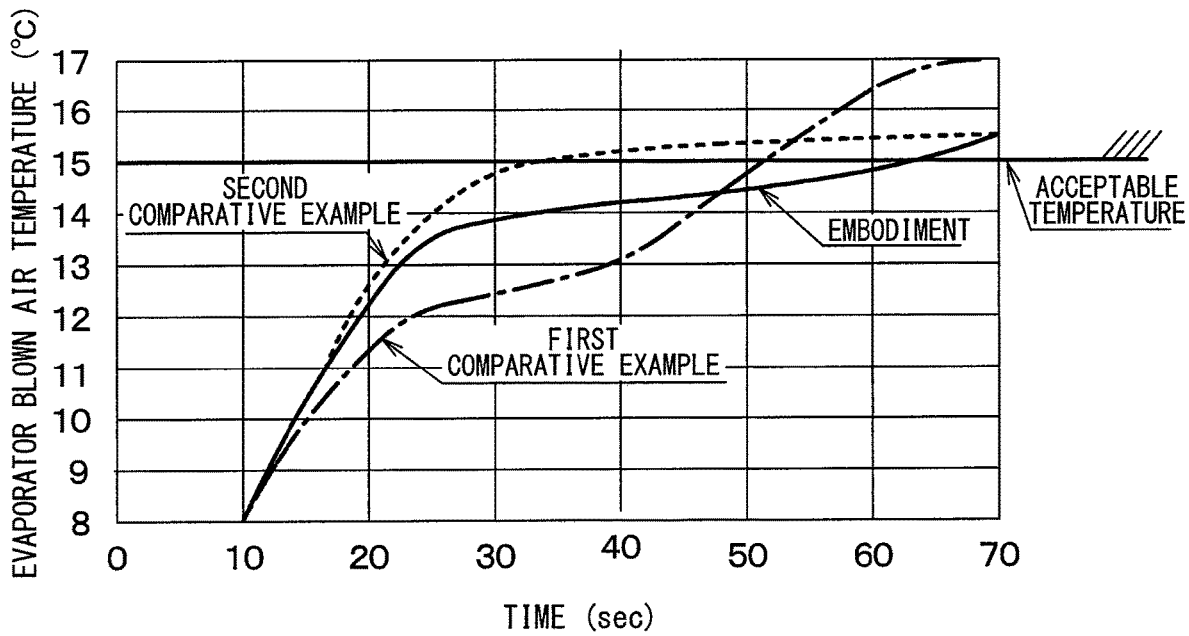
FIG. 10 is a graph showing a relationship between a time length of idle reduction control and an evaporator blown air temperature.

FIG. 10 shows a result of a simulation for a relationship between a time length of idle reduction and the evaporator blown air temperature in the cold energy storage evaporators 40 having different specifications.

The preconditions of this simulation include: the evaporator drawn air is 28 degrees Celsius; the relative humidity of the evaporator drawn air is 35%; and the flow rate of the evaporator drawn air is 180 m3/h.

A solid line shown in FIG. 10 is a characteristic line of the cold energy storage evaporator 40 of the present embodiment. The cold energy storage member 61 of this cold energy storage evaporator 40 has the melting point of 12 degrees Celsius. In the cold energy container 6, the cold energy storage member heat transfer distance L is set within the heat transfer optimal range, and the cold energy container thermal resistance R is set within the thermal resistance optimal range.

A dot-and-dash line shown in FIG. 10 is a characteristic line of a first comparative example. Specifically, in the cold energy storage evaporator 40 of the first comparative example, the melting point of the cold energy storage member 61 is 10 degrees Celsius, and the cold energy storage member heat transfer distance L is within the optimal range of the heat transfer distance. The dot-and-dash line shown in FIG. 10 is a characteristic line of the cold energy storage evaporator 40 whose cold energy container thermal resistance R is within the optimal range of the thermal resistance.

A dashed line shown in FIG. 10 is a characteristic line of a second comparative example. Specifically, in the cold energy storage evaporator 40 of the second comparative example, the melting point of the cold energy storage member 61 is 12 degrees Celsius, and the cold energy storage member heat transfer distance L exceeds the upper limit of the optimal range of the heat transfer distance. The dashed line shown in FIG. 10 is a characteristic line of the cold energy storage evaporator 40 whose cold energy container thermal resistance R exceeds the upper limit of the optimal range of the thermal resistance.

In FIG. 10, the time length from when the compressor 10 stops during idle reduction to when the evaporator blown air temperature increases to the acceptable temperature (i.e. the acceptable temperature reaching time) is about 52 seconds in the first embodiment, and is about 35 seconds in the second embodiment.

In contrast, the acceptable temperature reaching time of the cold energy storage evaporator 40 of the present embodiment is about 64 seconds which is longer than that of the first comparative example and the second comparative example.

An average cooling capacity from the start of idle reduction to acceptable temperature of the cold energy storage evaporator 40 of the present embodiment is lower than that of the cold energy storage evaporator 40 of the first comparative example. Accordingly, if the heat capacity of the cold energy storage evaporators 40 is the same, the acceptable temperature reaching time of cold energy storage evaporator 40 of the present embodiment having relatively lower average cooling capacity is longer than that of the cold energy storage evaporator 40 of the first comparative example.

In the second comparative example, the melting point of the cold energy storage member 61 is high, and the heat transfer rate is low. Accordingly, the evaporator blown air temperature increases early before the cold energy storage member 61 finishes melting, and the acceptable temperature reaching time is short.

In contrast, in the cold energy storage evaporator 40 of the present embodiment, the cold energy storage member 61 melts more before the evaporator blown air temperature increases to the acceptable temperature while the compressor stops, than in the second comparative example in which the melting point of the cold energy storage member 61 is equal to the present embodiment. According to the cold energy storage evaporator 40 of the present embodiment, it is possible to keep the evaporator blown air temperature at or below the acceptable temperature for a longer time while the compressor is stopped than the second comparative example in which the melting point of the cold energy storage member 61 is equal to the present embodiment.

Next, the control of the compressor 10 in the refrigeration cycle device 1 will be described with reference to FIG. 11.

Figure 11:
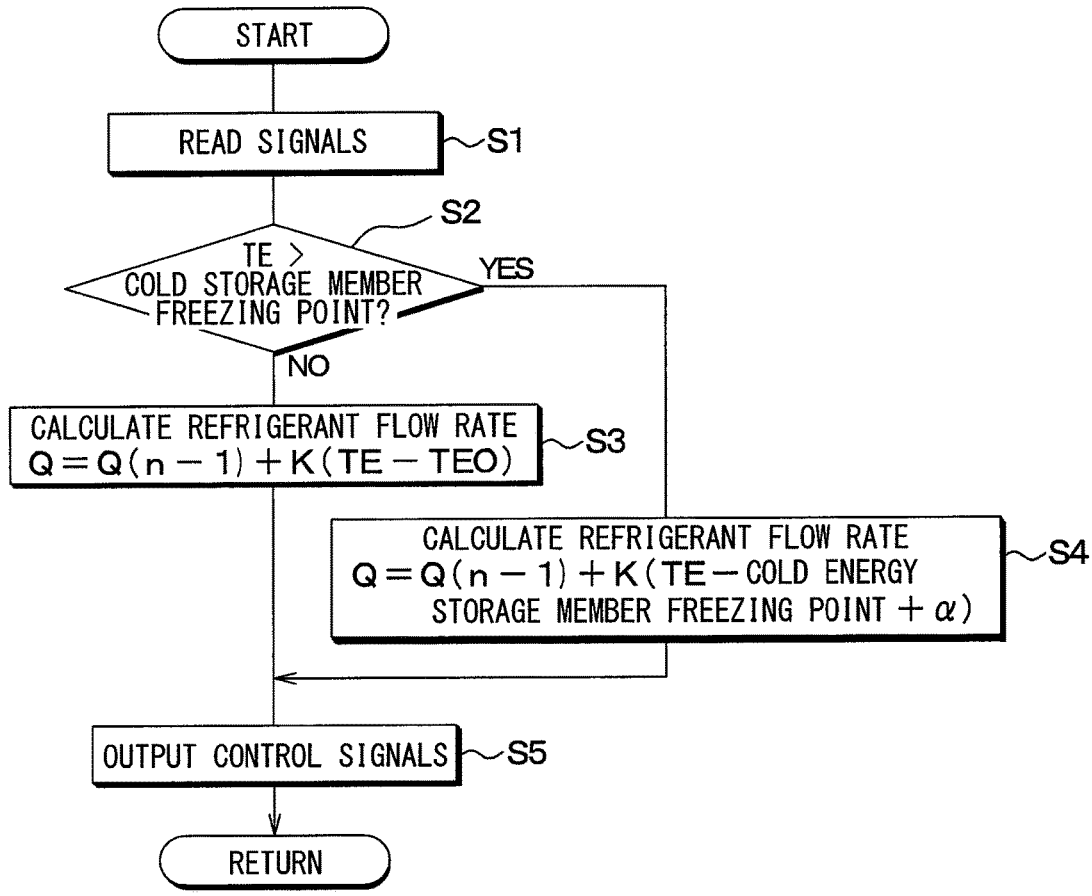
FIG. 11 is a flowchart of a program executed by an air-conditioning controller of the refrigeration cycle device of FIG. 1.

FIG. 11 is a flowchart of a program read and executed by the CPU of the air-conditioning controller 3. The process described in FIG. 11 is executed at a predetermined cycle while the refrigeration cycle device 1 is operating in the economy mode.

When the economy mode operation is started, the air-conditioning controller 3 reads the signal from the evaporator temperature sensor in the sensor group 4 in step 1 to acquire the information of the evaporator refrigerant temperature TE. Then, in step 2, the air-conditioning controller 3 determines whether the evaporator refrigerant temperature TE is higher than the freezing point of the cold energy storage member 61. The freezing point of the cold energy storage member 61 is set preliminarily.

When the evaporator refrigerant temperature TE is lower than the freezing point of the cold energy storage member 61, a negative determination is made in step 2, and the process proceeds to step 3.

In step 3, the air-conditioning controller 3 calculates a target refrigerant flow rate Q which is a target value of the refrigerant flow rate discharged from the compressor 10 by the following equation 4. The air-conditioning controller 3 stores, in a memory unit, the target refrigerant flow rate Q calculated in step 3.

$$Q=Q(n-1)+K(TE-TEO) \quad \text{Equation 4}$$

Q(n−1) is the target refrigerant flow rate calculated last time. K is a coefficient. TEO is a target evaporator refrigerant temperature that is a target temperature of the evaporator refrigerant temperature TE.

When the evaporator refrigerant temperature TE is higher than the freezing point of the cold energy storage member 61, a positive determination is made in step 2, and the process proceeds to step 4.

In step 4, the air-conditioning controller 3 calculates a target refrigerant flow rate Q which is a target value of the refrigerant flow rate discharged from the compressor 10 by the following equation 5. The air-conditioning controller 3 stores, in the memory unit, the target refrigerant flow rate Q calculated in step 4.

$$Q=Q(n-1)+K(TE-\text{freezing point of the cold energy storage member } 61+\alpha) \quad \text{Equation 5}$$

α is a constant.

The air-conditioning controller 3 calculates the target refrigerant flow rate Q in step 3 or step 4, and subsequently the air-conditioning controller 3 outputs a control signal to the compressor 10 such that the flow rate of the refrigerant flowing out of the compressor 10 becomes the target refrigerant flow rate Q.

The target evaporator refrigerant temperature TEO in the economy mode operation is higher than in the cool mode operation. Accordingly, a temperature difference between the freezing point of the cold energy storage member 61 and the target evaporator refrigerant temperature TEO set in the economy mode operation is smaller than in the cool mode operation. Therefore, if the target refrigerant flow rate Q is calculated by using Equation 4 in the economy mode operation as in the cool mode operation, the cold energy storage member 61 may be unlikely to freeze.

In contrast, in the present embodiment, when the evaporator refrigerant temperature TE is higher than the freezing point of the cold energy storage member 61, the target refrigerant flow rate Q increases with increase of the difference between the evaporator refrigerant temperature TE and the freezing point of the cold energy storage member 61, as is obvious from the above-described Equation 5. Accordingly, the flow rate of the refrigerant flowing through the refrigerant tubes 45 increases. Consequently, the evaporator refrigerant temperature TE quickly decreases, and thus the cold energy storage member 61 can quickly freeze.

According to the cold energy storage evaporator 40 of the present embodiment, it is possible to keep the evaporator blown air temperature at or below the acceptable temperature for a long time while the compressor is stopped. According to the refrigeration cycle device 1 of the present embodiment, the cold energy storage member 61 can freeze early in the economy mode operation by decreasing the evaporator refrigerant temperature TE quickly.

Second Embodiment

A second embodiment will be described with reference to FIG. 12. In the present embodiment, the configuration of the cold energy container 6 is different from that of the first embodiment. In the present embodiment, descriptions of parts similar or equivalent to those of the first embodiment are omitted or simplified.

Figure 12:
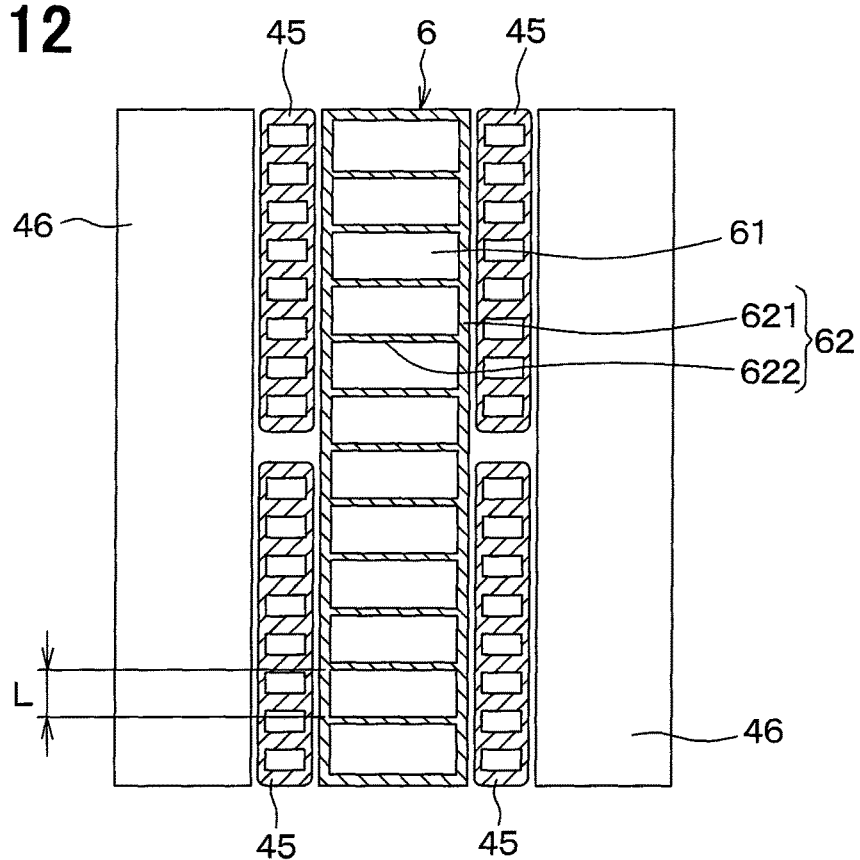
FIG. 12 is a cross-sectional view according to at least one embodiment, the cross-sectional view showing a cold energy storage evaporator similarly to FIG. 4.

As shown in FIG. 12, the casing 62 of the cold energy container 6 includes: a casing member 621 having a flat cylindrical shape and defining an inner space in which the cold energy storage member 61 is accommodated; and multiple connection walls 622 provided in the casing member 621 and connecting two walls of the casing member 621 facing each other.

The casing 62 is a multi-hole tube, and the casing member 621 and the connection walls 622 are integrated with each other by extraction molding.

The connection wall 622 promotes a heat transfer between the cold energy storage member 61 and the casing member 621. Accordingly, the cold energy container 6 does not include the inner fin 63. The connection wall 622 serves as a connection member that connects two walls of the casing 62 facing each other.

In the present embodiment, a distance between adjacent connection walls 622 is the cold energy storage member heat transfer distance L. A total surface area of portions of all connection walls 622 in contact with the cold energy storage member 61 is the heat transfer area A. In the cold energy container 6, the cold energy storage member heat transfer distance L is set within the heat transfer optimal range, and the cold energy container thermal resistance R is set within the thermal resistance optimal range.

According to present embodiment, the same effects as the first embodiment can be obtained.

Third Embodiment

A third embodiment will be described with reference to FIGS. 13, 14. In the present embodiment, the configuration of the inner fin 63 is different from that of the first embodiment. In the present embodiment, descriptions of parts similar or equivalent to those of the first embodiment are omitted or simplified.

Figure 13:
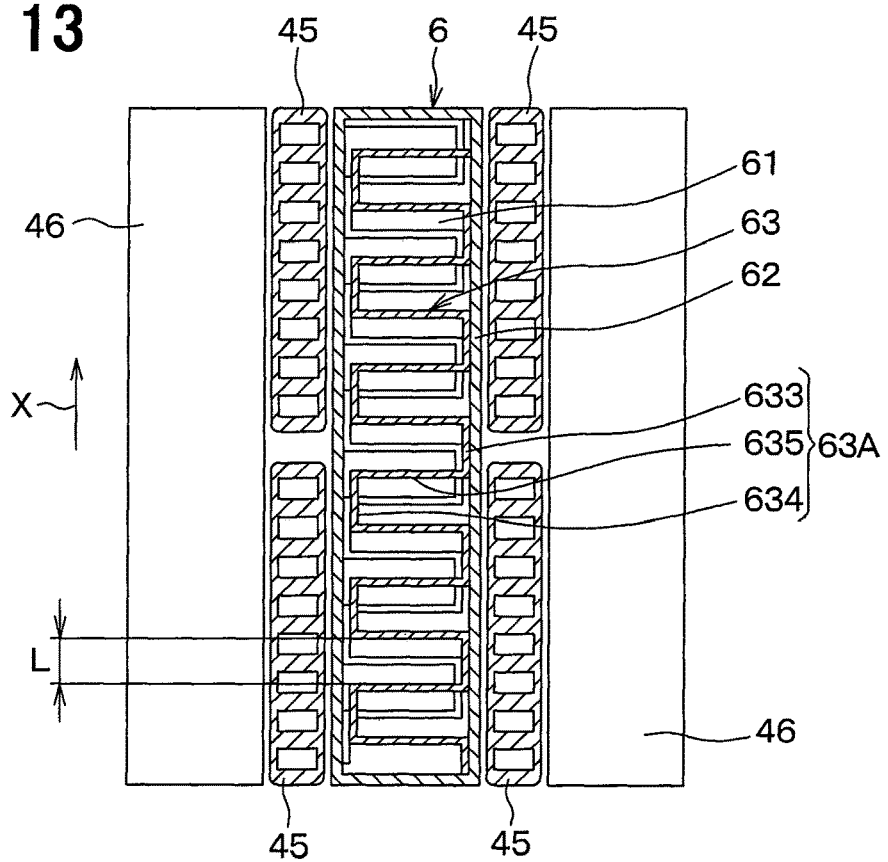
FIG. 13 is a cross-sectional view according to at least one embodiment, the cross-sectional view showing a cold energy storage evaporator similarly to FIG. 4.
Figure 14:
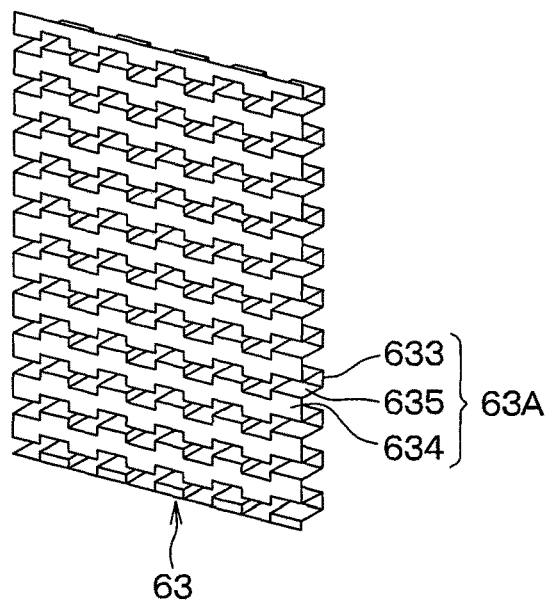
FIG. 14 is a perspective view illustrating an inner fin of FIG. 13.

As shown in FIGS. 13, 14, the inner fin 63 is an offset fin. In the inner fin 63, multiple corrugated portions 63A bent in the air flow direction X are arranged along the longitudinal direction of the casing 62 (i.e. a direction perpendicular to a sheet of FIG. 13), and adjacent corrugated portions 63A are offset from each other in the air flow direction X.

The corrugated portion 63A includes first peak portions 633 having flat shapes and connected to one of two walls of the casing 62 facing each other, and second peak portions having flat shapes and connected to the other one of two walls of the casing 62 facing each other. The corrugated portion 63A includes connection plate portions 635 connecting the first peak portions 633 and the second peak portions 634.

In the present embodiment, a distance between adjacent connection plate portions 635 adjacent in the air flow direction X is the cold energy storage member heat transfer distance L. In the cold energy container 6, the cold energy storage member heat transfer distance L is set within the heat transfer optimal range, and the cold energy container thermal resistance R is set within the thermal resistance optimal range.

According to present embodiment, the same effects as the first embodiment can be obtained.

Fourth Embodiment

A fourth embodiment will be described with reference to FIG. 15. In the present embodiment, the configuration of the cold energy container 6 is different from that of the first embodiment. In the present embodiment, descriptions of parts similar or equivalent to those of the first embodiment are omitted or simplified.

Figure 15:
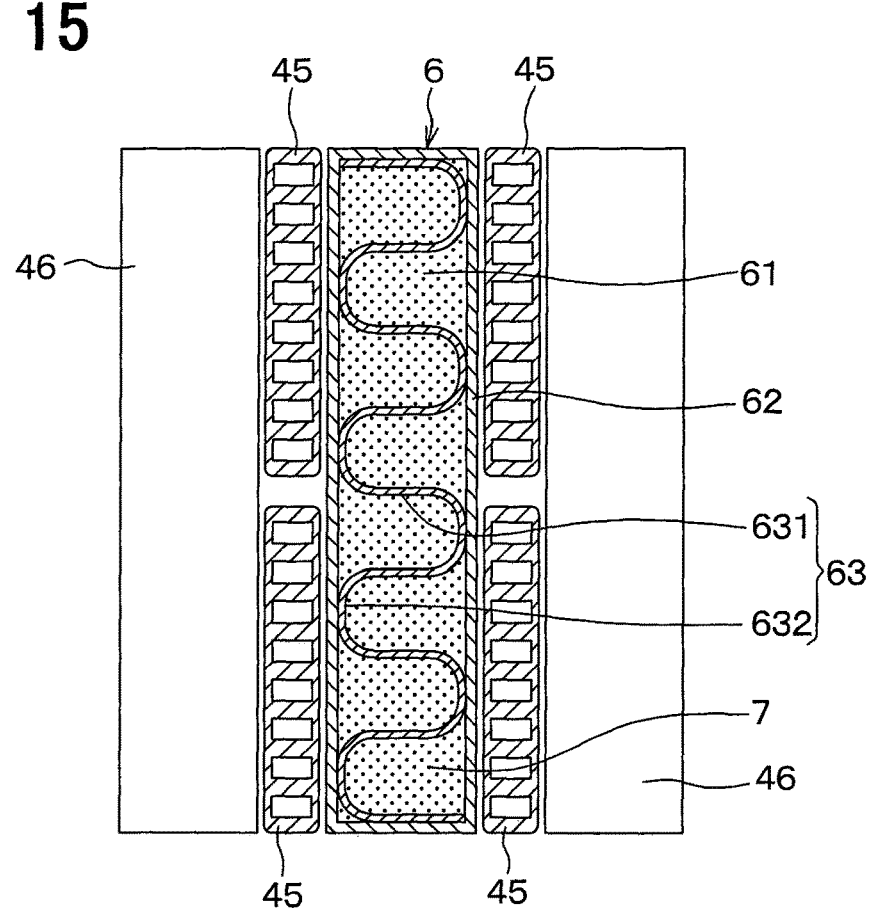
FIG. 15 is a cross-sectional view according to at least one embodiment, the cross-sectional view showing a cold energy storage evaporator similarly to FIG. 4.

As shown in FIG. 15, a heat transfer promoting substance 7 that promotes the heat transfer between the cold energy storage member 61 and the casing 62 and between the cold energy storage member 61 and the inner fin 63 is enclosed in the casing 62 of the cold energy container 6. The heat transfer promoting substance 7 is a carbon nanotube or powder of metal such as aluminum and is mixed in the cold energy storage member 61.

The cold energy container thermal resistance R of the cold energy container 6 is adjusted within the thermal resistance optimal range (i.e., the range indicated by oblique lines in FIG. 6) by the heat transfer promoting substance 7.

According to present embodiment, the same effects as the first embodiment can be obtained.

OTHER EMBODIMENTS

The present disclosure is not limited to the above-described embodiments. The present disclosure may be modified as long as the temperature of the air flowing out of the cold energy storage evaporator 40 is kept at or below the acceptable temperature for a long time while the compressor is stopped.

Individual elements or features of a particular embodiment are generally not limited to that particular embodiment, but, where applicable, are interchangeable and can be used in a selected embodiment, even if not specifically shown or described.

Individual elements or features of a particular embodiment are not necessarily essential unless it is specifically stated that the elements or the features are essential in the foregoing description, or unless the elements or the features are obviously essential in principle.

A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle.

Furthermore, a material, a shape, a positional relationship, or the like, if specified in the above-described example embodiments, is not necessarily limited to the specific shape, positional relationship, or the like unless it is specifically stated that the material, shape, positional relationship, or the like is necessarily the specific material, shape, positional relationship, or the like, or unless the shape, positional relationship, or the like is obviously necessary to be the specific shape, positional relationship, or the like in principle.

CONCLUSION

According to a first aspect described in a part or all of the above embodiments, the cold energy storage evaporator includes the cold energy storage member having the melting point of 11 degrees Celsius.

According to a second aspect, in the cold energy storage evaporator, $-0.13x+1.8 \leq L \leq -0.42x+6.3$, where x is the melting point of the cold energy storage member, and L is the cold energy storage member heat transfer distance that is a distance between the adjacent connection members.

According to this, the cold energy storage member in the cold energy container can melt early.

According to a third aspect, in the cold energy storage evaporator, $-0.52x+6.3 \leq R \leq -4.5x+61$, where x is the melting point of the cold energy storage member, and R is the cold energy container thermal resistance that is a resistance generated when the heat is transferred from the cold energy storage member to the surface of the air side fin.

According to this, the cold energy storage member in the cold energy container can melt early.

According to a fourth aspect, in the cold energy storage evaporator, the heat transfer promoting substance that promotes heat transfer between the cold energy container and the cold energy storage member is mixed in the cold energy storage member.

According to this, the cold energy storage member in the cold energy container can melt early.

According to a fifth aspect, the refrigeration cycle device including the cold energy storage evaporator is configured to increase the flow rate of the refrigerant flowing through the refrigerant tube with an increase of the difference between the evaporator refrigerant temperature and the freezing point of the cold energy storage member when the evaporator refrigerant temperature is higher than the freezing point of the cold energy storage member.

Consequently, the evaporator refrigerant temperature quickly decreases, and thus the cold energy storage member can quickly freeze.

What is claimed is:

1. A cold energy storage evaporator for a vehicle refrigeration cycle device configured to cool a vehicle compartment, the cold energy storage evaporator comprising:
a refrigerant tube through which a refrigerant flows;
a cold energy container that is in close contact with the refrigerant tube, the cold energy container accommodating therein a cold energy storage material configured to freeze due to heat absorption by the refrigerant;

an air side fin that is in close contact with the refrigerant tube, the air side fin being configured to promote a heat exchange between the refrigerant and a blown air, wherein a melting point of the cold energy storage material is higher than 11 degrees Celsius, the melting point of the cold energy storage material is defined as x, a resistance generated when heat is transferred from the cold energy storage material to a surface of the air side fin is defined as a cold energy container thermal resistance R, and $-0.52x+6.3 \leq R23 -4.5x+61.$

* * * * *